(No Model.)

A. A. STEARNS.
BEAN PLANTER.

No. 278,372. Patented May 29, 1883.

Attest,
Jno. C Perkins
J. L. Dier

Inventor,
Amos A. Stearns
By Lucius C. West
Atty.

N. PETERS. Photo-Lithographer, Washington, D. C.

UNITED STATES PATENT OFFICE.

AMOS A. STEARNS, OF COOPER, MICHIGAN.

BEAN-PLANTER.

SPECIFICATION forming part of Letters Patent No. 278,372, dated May 29, 1883.

Application filed December 11, 1882. (No model.)

*To all whom it may concern:*

Be it known that I, AMOS A. STEARNS, a citizen of the United States, residing at Cooper, county of Kalamazoo, State of Michigan, have invented a new and useful Bean-Planter, of which the following is a specification.

My invention has for its object to construct an improved feed for seeders and planters especially adapted for use in planting beans.

Figure 1:
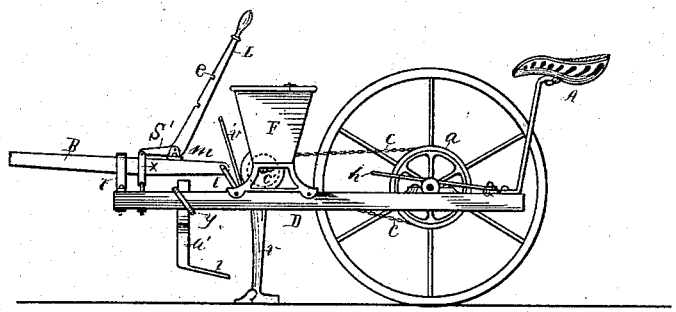
Figure 2:
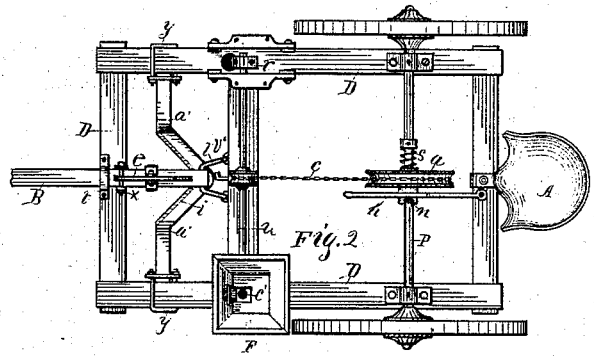
Figure 3:
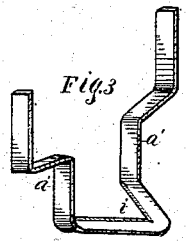
Figure 4:
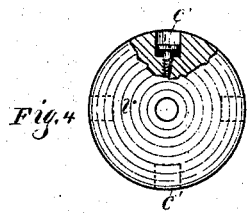
Figure 5:
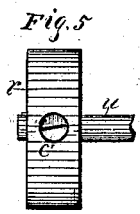
Figure 6:
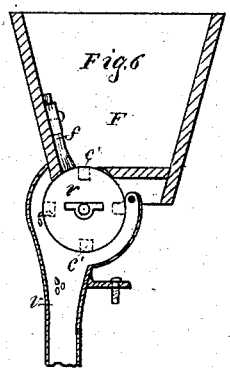

In the drawings forming a part of this specification, Figure 1 is a side elevation of the planter and harvester complete; Fig. 2, a top view of same, with one seed-box removed; Fig. 3, the harvester-hoe in perspective; Fig. 4, a side view of the feed enlarged; Fig. 5, an edge view of the same; Fig. 6, a cross-section of a feed-box on a line with the side of the feed.

D D is a rectangular frame, provided with a revoluble axle having supporting-wheels rigidly secured at each end. The axle P is located well to the rear of the frame. The feed-boxes F F are located forward of axle P at each side of the frame. In the feed-boxes are located the feeds r, which are rigidly secured to the revoluble axle u. The axles P u are each provided with a center chain-wheel and chain c, by which means motion is imparted to the feeds. The chain-wheel a is locked with axle P by clutch n, engaging projections on the axle, said engagement being held by spring S. By means of the pivoted lever h wheel a may be moved laterally on the axle, disengaging the clutch and throwing the device out of gear.

The feed consists of a wheel, r, preferably wood, having pockets c', bored in the periphery and extending toward the axis. The amount of beans planted in each hill is controlled by the dimensions of the pockets, which are changeably fixed by the adjustable bottom, consisting of a screw driven in the bottom of the cup, Figs. 4 and 5. The screw-head, being flat and as large as the pocket, forms the bottom, and, by turning it out or in, decreases or increases its size. f is a brush adjustably secured in the side of the feed-box F in a position to sweep the periphery of the wheel r and strike the pockets off level full of beans, Fig. 6, prior to their being emptied in tube v. Any suitable share and coverer may be connected with the bottom of tube v.

To control the depth of cut of the share, the frame D D may be raised and lowered by vertically tilting the forward end, said frame being pivoted on the axle P. The forward end of the frame is held up while in operation by the team, which is hitched to the tongue B.

The means used for tilting the frame are very simple and conveniently operated. They consist in an oblique-angled lever, L, provided with notches e e, in which the hook r' is caught to lock the lever back at a given point. The lever is pivoted at m, from which point extends a short horizontal arm, S'. The tongue B is located a little above the frame, and is hinged to a cross-beam of the frame by means of loop l. A loop, t, is secured to the forward beam of the frame and surrounds the tongue. This loop is higher than the thickness of the tongue, which allows the frame to be raised and lowered, said loop preventing lateral play of the tongue. A loop, X, also surrounds the tongue, and is longer than the thickness of said tongue. It is hinged to the forward beam of the frame and with the arm S' of lever L. A greater vertical movement of the frame may be made by this plan with less power required, and only at the point where it is needed, where the devices are located which work in the soil. When desiring to harvest the beans, I connect with this vertically-tilting frame a harvester-hoe having a V-shaped base, i, and upward-extending sides for connecting with the sides of the frame D D at the forward end. The inner edges of the V part of the hoe are sharpened. The hoe is vertically adjustable, being secured to the frame by clips y. In the operation, the hoe i runs beneath the surface of the soil against the roots of a row of beans, which unearths them, ready for gathering up.

Having thus described my invention, what I claim as new, and desire to secure, is—

1. In a bean-planter, the combination, with the frame having the hinged tongue passing through the loop rigidly connected with the frame, the lever pivoted to the tongue, and having an arm hinged to the loop which surrounds the tongue, and which is hinged to the frame, of a feed-box, feed, and feed-tube, all substantially as set forth.

2. A vertically-tilting planter-frame, pivotally supported by the wheel-axle, provided with the hinged tongue, the rigid and hinged loops which surround said tongue, and the lever pivoted to the tongue and hinged to the hinged loop, all combined substantially as described and shown.

3. The vertically-tilting frame, the tongue located a little above and hinged thereto, the hinged loop, the lever having the short arm hinged to said loop, said lever being pivoted to the tongue, the hinged lock-bar adapted to engage the notches of the lever, and the loop which is rigidly secured to the frame, all in combination, substantially as shown.

AMOS A. STEARNS.

Witnesses:
J. S. DUER,
JNO. C. PERKINS.